United States Patent

[11] 3,622,983

[72] Inventor Jacques V. Deregnaucourt
Ottawa, Ontario, Canada

[21] Appl. No. 868,281
[22] Filed Oct. 10, 1969
[45] Patented Nov. 23, 1971
[73] Assignee Northern Electric Company Limited
Montreal 101, Quebec, Canada
Continuation-in-part of application Ser. No. 579,760, Sept. 15, 1966, now abandoned. This application Oct. 10, 1969, Ser. No. 868,281

[54] PSEUDODENSITY MODULATION SYSTEM
2 Claims, 2 Drawing Figs.

[52] U.S. Cl. .......... 340/146.1, 325/38 A, 325/41
[51] Int. Cl. .......... G08c 25/00
[50] Field of Search .......... 340/146.1; 325/41, 42, 38 A, 323; 178/68; 179/15

[56] References Cited

UNITED STATES PATENTS

| | | | |
|---|---|---|---|
| 3,088,099 | 4/1963 | Du Vall .......... | 340/169 X |
| 3,343,087 | 9/1967 | Helms .......... | 325/42 X |
| 3,388,330 | 6/1968 | Kretzmer .......... | 325/42 X |
| 3,394,312 | 7/1968 | Pfeiffer et al. .......... | 325/38 |

*Primary Examiner*—Charles E. Atkinson
*Attorney*—John E. Mowle

ABSTRACT: Data at a first bit rate which is to be transmitted on a data line having a much higher bit rate is encoded in a (3, 1) block code which is repeated as many times as necessary to fill all available bits on the data link. This data may be detected at the receiving end of the data link by the use of a low-pass filter, and the data can be reconstituted with very simple equipment.

PSEUDODENSITY MODULATION SYSTEM

Figure 1:
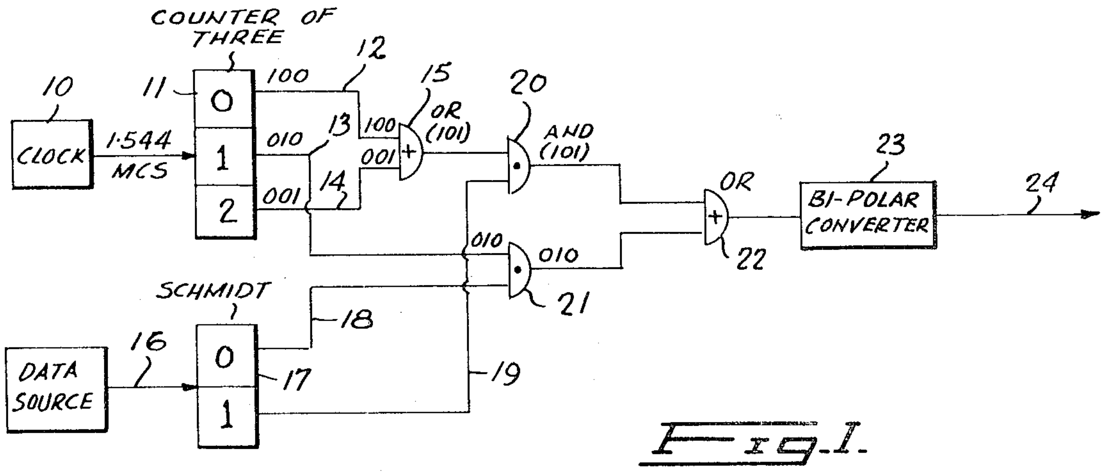

The present application is a continuation-in-part of my prior application Ser. No. 579,760, filed Sept. 15, 1966 and now abandoned.

The present invention relates to a method and apparatus for the transmission of binary data over a data link having a much greater pulse repetition rate than that required for a single channel of the data being transmitted. In particular the present invention is concerned with the transmission of data such as that derived from a computer at, for example, a rate of 40.8 kilobits/second on a repeatered telephone line which has an operating pulse repetition rate such as, for example, of 1.544 millibits/second. Such telephone lines are currently in use for the simultaneous transmission of up to 24 one-way Pulse Code Modulation telephone conversations on a single pair in a telephone cable.

These data links consist of a cable pair along which self-timed regenerative repeaters are spaced at intervals of approximately 6,000 feet. These repeaters are designed to operate at a bit rate of approximately 1.544 millibits/second, and require an input at this frequency for satisfactory operation. The present invention provides apparatus for using such a repeatered line for the transmission of other data occurring at a bit rate different than the design rate of the repeatered telephone line. The present invention may be used in any case where the bit rate of the repeatered line is more than three times the data rate of the information to be transmitted on the repeatered line.

If we consider a transmission line which is capable of transmitting only binary signals at discrete intervals, (that is, a sequence of time slots which are either blank or occupied by a pulse) pulse density modulation is a process which allows the transmission of an analog signal over that line. The minimum valve of the analog signal is represented by a continuous sequence of 0's and the maximum valve is represented by a continuous sequence of 1's Intermediate valves are represented by hybrid sequences comprising a value proportionate to the 1's and 0's. It is obvious in the prior art that variations of the analog signals which are of the same order of duration as the pulse repetition period of the binary signal cannot be transmitted. However, if the pulse repetition rate of the binary signal is much higher than the highest frequency component of the analog signal then transmission is possible and the quality is limited only by the ratio of the pulse repetition rate to the frequency of the analog signal. Modulation methods and transmission characteristics for pulse density modulation have been abundantly described in current literature. The essential advantage of pulse density modulation is that it can be transformed into analog amplitude modulation just by processing the binary pulse stream through a simple low-pass frequency filter.

What is meant by density is the proportion of ones on the total pulse train.

At the present time, telephone companies in North America are installing and using a time division multiplex pulse code modulation system known as the T1 system for increasing the capacity of short haul interexchange telephone cables. This system multiplexes 24 one-way telephone channels on a single pair of wires in a conventional telephone cable. This telephone cable is provided with self-timed regenerative repeaters which enable the single-pair communication channel to operate at a bit rate of 1.544 millibits/second. This PCM system is suitable for short-distance use such as between exchanges or central offices of the telephone company, and between local exchanges and toll offices.

Further details of the T1 telephone system are available in numerous sources such as the Bell System Technical Journals and reference should be had to these publications for any further information required.

At the present time there is a growing demand for data channels for the transmission of data from computers to input/output devices and between different computer facilities so that data can be transferred online in machine language without the necessity for translation and transmission in some other mode. Where there has been extensive installation of PCM telephone equipment, spare channels may be available which could be used from time to time for the transmission of computer data. The present invention provides apparatus suitable for transmitting such computer data on a repeatered line and demodulation of such data from the line.

The output data rate of present computing equipment is substantially less than the bit rate of the repeatered line. For example one known computer data rate is 40.8 kilobits/second. It is a feature of the present invention to provide apparatus which may be used for the transmission of such computer data on a repeatered line.

If a pulse density modulation signal is applied to a (PCM) T1 repeatered line to transmit 40.8 kilobits of binary data signals, this would result in long sequences of 1's and long sequences of 0's in the repeatered line corresponding to the 1's and 0's of the input signal. Long sequences of 0's are not permitted in the T1 repeatered system because the presence of a minimum of one pulse out of 16 is necessary to keep the repeaters in synchronism. This condition is not specific to the T1 system; it is general to most pulse code modulation systems using cables and self-timed repeaters; that is all the existing PCM systems. Thus the idea behind the present invention is to provide a pseudodensity modulation where the pulse train is not only constrained to have an average density of two different valves corresponding to the 0's and 1's of the input pulse train but to have a specific format which feeds the repeatered lines with enough pulses to keep the repeaters in synchronism and which have densities enough apart that the detection by low-pass filter and threshold logic is simple. In addition the modulation can be processed through an error-correcting circuit when the error probability in the repeatered line justifies the expense.

In accordance with the invention, the data to be transmitted is encoded in a three-bit binary block code in which the binary numeral 1 is indicated by the presence of the first and third bits in the block, and the binary digit 0 is indicated by the presence of 0's in the first and third positions and a "1" in the second position of the block code. A (3, 1) block code is a well-known term of art which may be found in the textbooks, such as for example, "Error Correcting Codes" by W. W. Peterson, published by M. I. T. Reference may be had to this textbook to gain an understanding of the art of error-correcting codes to which the invention relates. In order that the data link is properly fed the required input at the required bit rate, the block code for each digit of the data being transmitted may be repeated as many times as necessary in order to fill all available bit spaces on the data link. In accordance with a further feature of the invention it is possible to multiplex the outputs of several data sources by time division multiplex techniques, onto a single data link.

An inherent advantage of using the (3, 1) block code of the present invention is that it may be detected at the receiving end of the line by the use of a low-pass filter and thus the transmitted data can be reconstituted at the receiving end of the line with very simple equipment. Accordingly an important feature of the present invention is to code the signal of the repeatered line in a (3, 1) block code and repeat this code as many times as necessary to complete the number of pulses required by the line, and then to decode the block code as density modulation.

Figure 2:
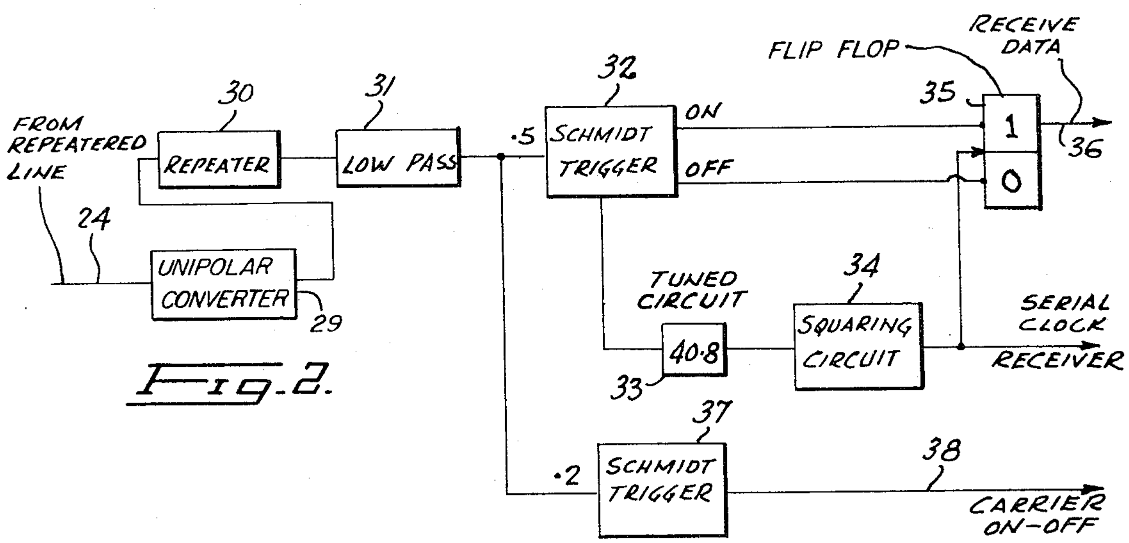

In drawings which illustrate the transmitting and receiving ends of a data link using the equipment of the present invention:

FIG. 1 is a schematic block diagram of the transmitting end of a communication channel for transmitting data on a line of a telephone pulse code modulation system, and FIG. 2 is a block diagram of the receiving end of such a data link.

Referring to FIG. 1, there is shown apparatus for encoding data having a bit rate, for example, of 40.8 kilobits/second for transmission on a data link operating at a frequency, for example, of 1.544 millibits/second. A free-running clock 10 drives a counter-of-three 11 at a bit rate of 1.544 millibits/second. A counter-of-three, also known as a three-bit 59 ring counter, is an electronic circuit which has three stable states and which switches from one to the other in sequence whenever a pulse is transmitted to its input. This is a device well known in the art of data processing. The outputs 12, 13, and 14 of the counter 11 are then passed through suitable logical circuits to generate the required block codes. It should be noted that the output on each of the three lines contains one pulse present in each period of the counter-of-three. Any of these lines could be selected to define the "0" code. Although any two of these lines will contain the two 1's and the 0 which characterize the "one" code, it is necessary to select the two lines which are not used to generate the "zero" code. This particular arrangement is necessary to generate an output which is a real (3, 1) block code, and not merely a density modulation output. The "zero" code and the "one " are therefore the complement of one another. This "coherence" of the code is an essential feature of the invention. The input data from the source 16 is applied to the Schmidt trigger 17 where it is regenerated and appears on output lines 18 and 19 which drive AND-circuits 20 and 21. The output on line 18 is indicative of a 0 input from source 16 and the output on line 19 is indicative of a 1 input from source 16. Accordingly, AND-circuit 20 is conditioned to transmit the output of OR-circuit 15 when a 1 is present, and the AND-circuit 21 is conditioned to transit an output on line 13 when a 0 is present in the data from the data source 16. The outputs from AND-circuits 20 and 21 are passed to the OR-circuit 22 which transmits all outputs from the AND-circuits 20 and 21 to a bipolar converter 43 which feeds onto the repeatered line 24. As is well known, a bipolar converter is an electronic circuit which transmits a pulse at its output whenever a pulse arrives at its input. Its specific operation is that its input accepts only positive pulses and 0's. Its outputs are alternatively positive and negative, the 0's being transmitted as such. In other words, an input of 0 is transmitted as an output 0, an input of 1 is transmitted either as a +1 or −1; a +1 if the last output was −1 and a −1 if the previous output was a +1. This is a well-known device in wide scale commercial use.

It will be appreciated that the block 10 may be free-running and not synchronized with the clock of the data source feeding line 16. Hence the operation of a Schmidt trigger 17 to open and close AND-gates 20 and 21 may cause errors in the translation of the input to the Schmidt trigger 17 to the data line 24. The following table illustrates the possible resulting errors from the sampling encoding of the present invention.

TABLE I (3, 1) Block Code

| | | |
|---|---|---|
| Information Digits | 1 | 0 |
| No Error | 101 | 010 |
| Single Error | 001 | 110 |
| | 111 | 000 |
| | 100 | 011 |
| Density | .66 | .33 |

A density of 0.66 means that two-thirds of the pulses are 1 which automatically implies that one-third of the pulses are 0.

With a repeatered line having a bit rate of 1.544 millibits/second and a data source having a bit rate of 40.8 kilobits/second, on the average 37.8 pulses are used to transmit one bit of data. This means that the (3, 1) block code is repeated 12 times correctly and there is one mutilated code word which will in general be erroneous.

If the switching from a 1 to a 0 happens during the transmission of a group of three bits which form a block of the code, then the first of the two first digits of the block may be transmitted according to one pattern and the remaining one or two may be transmitted according to the next pattern. This is not a timing error, this is a logic error and it will be decoded as 1 or 0 according to the pattern which belongs to the majority of the bits in the block if the system is processed through an error-correcting circuit. If it is processed through a low-pass filter, the correct density will be achieved at the next block.

FIG. 2 is the schematic block diagram of the equipment located at the receiving end of the data link. The input from the repeatered line 24 is fed to a unipolar converter 29, of conventional design, where the bipolar pulses are converted into unipolar pulses.

A repeater 30 accepts the unipolar input from the converter 29 and amplifies it to a suitable level, and this input is then passed to the low-pass filter 31. This low-pass filter is tuned to eliminate all frequencies above the third subharmonic of the clock frequency. By referring to table 1 it will be seen that the density of a 1 information digit is 0.66 and the density of a 0 information digit is 0.33 Accordingly when the output from the low-pass filter 31 is passed to a Schmidt trigger 32, the Schmidt trigger which has a trigger level of 0.5 will be controlled by the output from the filter 31 in accordance with the average density of the input block code. The output from the Schmidt trigger 32 is then passed through a tuned circuit 33, a squaring circuit 34 and to a J–K flip-flop 35. The output on line 36 is thus the reconstituted input that was supplied at line 16 of FIG. 1. A conventional Schmidt trigger has two critical levels one "up going" one "down going." That is to say, when the output is "0" it stays 0 as long as the input voltage does not exceed the "up" threshold $V_1$. When the output is "1" it stays "1" as long as the input voltage does not become smaller than the "down" threshold $V_2$. $V_2$ is normally smaller than $V_1$; however by adjusting the value of the feedback network, one can make $V_2$ very close to $V_1$. In this case the Schmidt trigger 32 behaves as though it had a single threshold, which is essentially 0.5. A second Schmidt trigger 37 having a trigger level of 0.2 is provided for detecting the presence of operating signals on the line and is used to provide a carrier ON/OFF output to the associated equipment on the line 38.

By a trigger level of 0.5 or a trigger level of 0.2, is meant that the output of the circuit is a 1 when the input analog level exceeds 0.5 of the maximum expected amplitudes in one case, and 0.2 in the other case.

When the Schmidt trigger 37 is adjusted to a trigger level of 0.2 as shown on the drawing then its function is to output a 1, when there are at least 20 percent of the pulses present at the input. This means that the system is in operation since even if there were a large succession of 0's the density in the line is at least 0.33. There is no absolute necessity in providing such output but most of the data sets have a "carrier on-off" output. Similarly a Serial Clock Receiver output is provided for synchronizing the input device of the machine receiving the data.

At the receiver, timing information may be derived by three different means. Firstly, all transitions from 0 to 1 or from 1 to 0 may be extracted and rectified and drive a pulse-excited tank circuit. Secondly, at the transmitter end each transition time may trigger the transmission of a special code of density 0.5 which consists of alternate 0's and 1's so that the main component of its spectrum is half the line pulse repetition rate. This component does not appear in the output of the line as a 0 or a 1, and accordingly a tuned circuit at the receiving end which is tuned at half the bit rate frequency may be used for selecting the special code and provide pulses for the timing tank circuit. Thirdly, the line pulse repetition rate may be synchronized with the data timing clock. In the example given above the ratio is 1930/51, then the exact timing frequency is recovered at the receiving end by a synchronizing device and the phase is extracted from the first few transitions of every massage. Of these three timing methods, the first is shown in FIG. 2 wherein a tuned circuit 33 is connected to the output of the Schmidt trigger 32, and the output of the tuned circuit 33 is connected to a squaring circuit 34, which squares the output of the tuned circuit 33 and drives the J–K flip-flop 35 which regenerates the received data.

The second method of timing has no restrictions associated with it, but is not compatible with the multiplexing of many channels onto the repeated line. The third method of timing is the most sophisticated. It is suitable for multiplexing and has no restriction except at the beginning of the message when the clock 10 must be synchronized with the data source 16.

The 1.544 megacycle clock is recovered in the repeater and it may be used if error correction is implemented. If error correction is not implemented the 40.8 clock can be recovered either by observing the time of transition between a 1 and a 0 or it can be derived from the 1.544 megacycle clock if this clock is synchronized with the input data clock in the transmitter. The 1.544 megacycle clock need not be recovered for the operation of the system. This is only an auxiliary operation which could ease the recovery of the 40.8 clock.

In general when a number of channels are multiplexed onto the one data link all the channels must synchronize with one another. This means that in practice the business machines which are generating the data must be synchronized by the transmission system. This creates quite a problem when the machines are on line with a large system connected to different data transmission links. One solution at present is to synchronize the data transmission network with a single director clock and to provide all subscriber locations with a well-defined pilot frequency in a manner comparable to the time dispatching system of a power distribution network. In accordance with the usual practice a buffer memory will normally be required at most interface points to solve problems of jitter and phase uncertainty.

For a practical system in accordance with the present invention, the timing circuits would be optional features and probably plug-in units so that different configurations of timing could be interchanged with a minimum of downtime.

With the system of the present invention it is possible to make high-speed data transmission compatible with the pulse code modulation carrier of a carrier system in the same cable under the same conditions of transmission distance. This system will in many cases be more economical than other known systems since it makes use of existing cable pairs and existing telephone equipment, and requires a minimum of input-output equipment for the repeatered line. Additionally the system of the present invention can be used as part of an integrated network of digital data transmission and may provide high-speed data channels at a cost comparable to or even lower than the cost of a telephone channel.

It should be understood that the novel aspect of the present invention is to decode the information through a low-pass filter which decoding may only be done with density modulation. This form of decoding is not possible with all (3, 1) block codes however the present invention provides for the use of low-pass filter demodulation with a particular (3, 1) block code and accordingly it is this aspect of the invention which is considered novel and of particular value.

I claim:

1. Apparatus for transmitting binary data of a given bit rate on a transmission link having a higher operating bit rate comprising a free-running clock generating output pulses at said higher bit rate of said transmission link, a counter-of-three connected to said free-running clock, and adapted to provide three outputs in time sequence, the first and third outputs of said counter-of-three being combined by a first OR circuit to provide a block code of the form 101, the second output from said counter-of-three being of the form 010, a Schmidt trigger connected to the source of binary data and having two outputs, one of said outputs being energized by the ZERO state of said binary data and the other of said outputs being energized by the ONE state of said binary data, said 0 output of said Schmidt trigger and said second output of said counter-of-three being fed to the inputs of a first AND circuit, the 1 output of said Schmidt trigger and the output of said first OR circuit being fed to the inputs of a second AND circuit, the outputs of said two AND circuits being fed to a second OR circuit whereby the output from said second OR circuit is a binary (3, 1) block code at the bit rate of the data link.

2. Apparatus for receiving binary data transmitted in a (3, 1) block code at a bit rate at least three times higher than the rate of said binary data comprising a low-pass filter tuned to reject all frequencies above the third subharmonic of said bit rate of the (3, 1) block code, a Schmidt trigger connected to the output of said low-pass filter, the output of said Schmidt trigger being fed to a binary data output circuit, and to a tuned circuit resonant at the frequency of said binary data, the output of said tuned circuit being coupled to a squaring circuit, the output of said squaring circuit being coupled to said output circuit whereby said binary data is reconstituted for transmission to user equipment.

* * * * *